Patented Sept. 5, 1950

2,521,359

UNITED STATES PATENT OFFICE 2,521,359

COPOLYMERS OF CYCLOPENTADIENE

John D. Garber, Cranford, N. J., assignor to Standard Oil Development Company, a corporation of Delaware No Drawing. Application November 27, 1945, Serial No. 631,235

7 Claims. (Cl. 260—85.3)

This invention relates to olefinic polymers; relates especially to low temperature polymers of cyclopentadiene; and relates particularly to low temperature copolymers of major proportions of cyclopentadiene and minor proportions of an isoolefin.

It has been found possible to produce polymers of isoolefins, especially isobutylene, by a low temperature treatment at temperatures ranging from −10° C. down to −164° C. by the application to the cold isoolefinic material of a Friedel-Crafts type catalyst, preferably in solution in a low-freezing, non-complex forming solvent. This reaction has, however, been considered to be unique to the isoolefins, especially isobutylene; and to mixtures containing a major proportion of isobutylene. Attempts to polymerize the ordinary diolefins at low temperatures by Friedel-Crafts catalysts have yielded relatively useless materials, since they tend to be infusible, insoluble, non-coalescing powders.

According to the present invention, it is now found that the low temperature polymerization reaction is applicable to cyclopentadiene alone to yield an excellent resin, and to cyclopentadiene containing varying minor proportions of an isoolefin such as isobutylene, to produce resins which are readily soluble in a variety of solvents and capable of a drying reaction with atmospheric oxygen or a curing reaction with sulfur and a variety of other agents to give tough, elastic, leathery products in which the physical characteristics are readily adjusted by the proportions and nature of the minor component.

Thus the invention produces a polymer of cyclopentadiene with or without minor proportions of modifiers, by a low temperature reaction utilizing a Friedel-Crafts type catalyst. Other objects and details of the invention will be apparent from the following description:

The invention primarily involves the polymerization of cyclopentadiene at low temperatures. For this purpose the cyclopentadiene, preferably having from 90% to 99% purity; a boiling point at approximately 41.0° C., a freezing point of approximately −85° C. and a refractive index $N_D^{20}$ 1.4461 is used. This material is cooled to a temperature ranging from 0° C. to −195.8° C., preferably to a temperature within the range between −40° C. and −164° C. and polymerized at this low temperature by the application thereto of a Friedel-Crafts catalyst which preferably is in solution in a low freezing, non-complex forming solvent in order to be in condition for rapid dispersion into the cold cyclopentadiene.

For the catalyst, any of the catalysts disclosed by N. O. Calloway in his article on "The Friedel-Crafts Synthesis" printed in the issue of "Chemical Reviews," published for the American Chemical Society at Baltimore, in 1935, in volume XVII, No. 3, the article beginning on page 327, the list being particularly well shown on page 375, may be used. It may be noted that while most of these catalysts are solids, a limited number are fluids including boron trifluoride which is a gas, and titanium tetra chloride which is a liquid. The fluid catalysts may be used directly as such. The solid catalysts are preferably dissolved in an appropriate solvent.

For the solvent, any material which will dissolve a substantial amount, preferably more than approximately 0.1% of the Friedel-Crafts catalyst, has a freezing point below 0° C., thereby being low-freezing, and will boil away from the dissolved catalyst substance with a rise in temperature above the normal boiling point of the solvent of no more than 1 or 2 degrees, thereby being non-complex-forming, is satisfactory. The preferred catalyst solvents are such substances as ethyl or methyl chloride, ethylene dichloride, chloroform, carbon disulfide, liquid ethylene, liquid ethane, liquid propane, liquid butane, and the like. These solvents are representative of a wide range of other substances, including the mono and poly halo aliphatic compounds, having freezing points below 0° C., the hydrocarbons which have freezing points below 0° C., and a considerable number of mixed solvents of the type of carbon disulfide.

The cyclopentadiene may be polymerized alone, or it may be copolymerized in major proportion with a wide range of copolymerizates, in minor proportions. The preferred copolymerizate is isobutylene, which by a special technique, can be copolymerized to a uniform copolymer. Other suitable copolymerizates are such substances as the higher isoolefins up to about 12 carbon atoms per molecule, the normal olefins up to about 12 carbon atoms per molecule, including propylene, normal butene, normal pentene, normal hexene, styrene, alpha methyl styrene, para methyl styrene, chloro styrene, 2-methyl butene, 2-methyl pentene, 2-methyl hexene, vinyl ethers, methallyl chloride and the like. These copolymerizates may be used singly or in admixtures of two or more with the cyclopentadiene, including such three component mixtures as those of cyclopentadiene with isobutylene and styrene; or with isoprene and isobutylene, or with dimethyl butadiene and isoprene, or with butadiene or isoprene or piperylene or dimethyl butadiene or myrcene or dimethallyl or the like.

It may be noted that any organic compound containing from 3 to 20 carbon atoms, and one or more double linkages is a suitable copolymerizate. That is, for the purposes of this specification an olefin is defined as any carbon-containing compound having 2 or more carbon atoms in which there is a double linkage between two of the carbon atoms. For the purposes of this specification, ethylene is the first member of a series of compounds which include propylene, the butenes, both normal and iso, and the higher members containing larger numbers of carbon atoms; includes the halogen substituted unsaturated compounds such as chloroprene and the like, includes styrene and all of its substituent compounds including alpha methyl and para methyl styrene, as well as halogen substituted styrenes.

Most of the examples in this application deal with cyclopentadiene having the empirical formula $C_5H_6$ and the structural formula

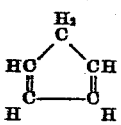

The invention is not however, limited to this single, first, member of the five carbon atom ring series but includes the substituted cyclopentadienes without regard to the number or position of substituents up to about six carbon atoms per substituent. The various methyl, ethyl and propyl mono- and poly-cyclo pentadienes are also particularly useful in this process.

In practicing the invention, it is found that the cyclopentadiene may be cooled to any convenient low temperature, as by the admixture therewith of liquid propane or solid carbon dioxide or liquid ethane or liquid ethylene; and the desired catalyst added in any convenient manner to the cold mixture; as by spraying onto the surface of the rapidly stirred olefinic material or in the form of a fine jet into the body of the rapidly stirred material.

The resulting material may have a Staudinger molecular weight number within the range from 3000 to 100,000, and an iodine number within the range between 50 to 300. The polymer is a plastic rubbery to resinous material soluble in hydrocarbon type solvents.

EXAMPLE 1

A portion of cyclopentadiene was cooled to a temperature of approximately —100° C. by the addition thereto of approximately 2½ volumes of liquid ethylene. To this mixture there was then added approximately ½ volume of a solution of aluminum chloride in methyl chloride; the solution containing approximately 0.8% of aluminum chloride. The material polymerized promptly into a semi-hard, somewhat leathery polymer. The polymer was separated by dumping the contents of the reactor into warm water to flash off the residue of liquid ethylene and to separate the unpolymerized cyclopentadiene. The solid polymer was then recovered by straining it out from the water slurry.

The polymer was found to have a Staudinger number (or molecular weight according to the Staudinger method) of approximately 6000 and it was found to be readily soluble in a considerable range of solvents including benzene, toluene, xylene and the like.

A solution of the polymer in benzene was flowed onto a test panel. The benzol evaporated promptly, leaving behind a thin film of the polymer. This polymer dried and hardened after standing several days into a very tough, strong film of low solubility in solvents of any sort, and excellent protective power including wear resistance, stability to light good adhesiveness and similar good physical properties.

EXAMPLE 2

A series of polymerizations were conducted on mixtures of cyclopentadiene with varying amounts of isobutylene; the polymerization catalyst and the cyclopentadiene being added simultaneously in successive small portions as the polymerization proceeded. The polymerization proportions, catalyst addition and time for addition of the catalyst and polymer are shown in the following Table I.

Table I

| Run #, B— | Feed Composition | | MeCl (cc.) | Catalyst Addition | | Time, min. | Reaction Temp., °C. | Iodine No. |
| --- | --- | --- | --- | --- | --- | --- | --- | --- |
| | $C_5H_6$ (g.) | $iC_4H_8$ (g.) | | Conc. g./100 cc. | Rate, cc./min. | | | |
| 30 | 10 | 90 | 500 | 0.15 | 36 | 3½ | —100 | 150 |
| 31 | 20 | 80 | 500 | 0.15 | 36 | 6½ | —100 | 171 |
| 32 | 30 | 70 | 500 | 0.15 | 36 | 5½ | —100 | 199 |
| 33 | 40 | 60 | 500 | 0.15 | 36 | 9 | —100 | 250 |
| 34 | 50 | 50 | 500 | 0.15 | 36 | 11 | —100 | 300 |
| 10 | 30 (cc.) | 80 | 500 (n-$C_4H_{10}$) | 0.06 | 36 | 21 | —100 | 172 |

These polymerizations were carried out in a liquid ethylene jacketed reactor, preferably in the presence of a diluent such as methyl chloride or butane or the like; the total amount of isobutylene being placed in the reactor along with approximately ¼ or less of the cyclopentadiene. The catalyst solution was then added in small portions and the cyclopentadiene similarly was added in successive small portions so that the full amount of catalyst and the full amount of cyclopentadiene were added nearly simultaneously. It may be noted that this procedure is advantageous because of the greater ease of polymerization of cyclopentadiene than isobutylene under the reaction conditions. Up to the end of the reaction, the copolymer was found to be soluble in the reaction mixture when butane was used as a diluent but not when methyl chloride was used. The iodine number, of course, varied according to the proportion of cyclopentadiene and isobutylene, being higher, the greater the proportion of cyclopentadiene.

It may be noted that while isobutylene is readily reactive in this low temperature polymerization reaction, the cyclopentadiene is considerably more easily reactive and accordingly, the initial polymerization yields a polymer having a much higher ratio of cyclopentadiene to isobutylene than the ratio of the two monomers in the polymerization mixture. If the polymerization is carried to completion, the resulting polymer contains in it the same proportion of the respective monomers as set by the proportion in the original feed mixture. However, the first portion of the polymer produced is much higher in the cyclopentadiene ratio and the final portion of polymer is much lower in cyclopentadiene ratio than the ratio of monomers in the polymerization mixture.

This is well shown by the following table in which the original proportions of cyclopentadiene and isobutylene are shown, and the resulting ratios in a polymer obtained by polymerizing only 50% of the monomer mixture.

| Feed Composition (Weight Per Cent) | | Copolymer Composition (Weight Per Cent) | |
|---|---|---|---|
| Cyclopentadiene | Isobutylene | Cyclopentadiene | Isobutylene |
| 50 | 50 | 72 | 28 |
| 40 | 60 | 62 | 38 |
| 30 | 70 | 50 | 50 |

It may further be noted, that in a mixture composed of 25 parts of cyclopentadiene and 75 parts of isobutylene, polymerized to yield a 20% conversion, the resulting polymer will contain 52.5% cyclopentadiene molecules and 47.5% isobutylene molecules.

It will thus be noted that unless special precautions are taken many copolymers of cyclopentadiene in which the polymerization is stopped at less than 100% contain a major proportion of cyclopentadiene.

This phenomenon can be avoided by the procedure of making up an original mixture, relatively very high in isobutylene and low in cyclopentadiene, proportions being chosen such that the polymerization yields the desired ratio, and then adding a small steady stream of catalysts and a small steady stream of mixed cyclopentadiene and isobutylene having the proportions of the desired copolymer, preferably removing the solid polymer either at frequent intervals or as rapidly as possible as it forms. By this procedure, the ratio in the polymerizate mixture is held at the desired value to produce the desired copolymer ratio and the mixture removed as polymer is continually replaced in the same proportion.

For test purposes, the various polymers were dissolved in approximately 10% solutions in toluene and coated on steel test panels. In some of the solutions a cobalt naphthenate catalyst was included; in others the catalyst was omitted. Some of the polymers were dried at room temperature in air for three days and were then tested for solubility in toluene; the test consisting in immersing the lower part of the test panel in toluene for one hour. At the end of this time, the panel was removed, dried and observed. This test is made in terms of the condition at the end of the hour, and the solubility is reported as CS=completely soluble, PSD=partially soluble with a defined line marking the toluene surface, PSF=partially soluble with a faint line, I=completely insoluble with no line. Other samples were dried in an oven at 110° C. for 3 hours and 15 hours and similar tests were made. The same panels were tested for hardness, the hardness being determined by pencil reaction, the hardness relationships being determined by the hardest drawing pencil of the standard series which would leave a black mark on the film and the softest pencil of the same series which would scratch it, the hardness numbers being indicated according to the following table:

| Pencil Marked | | HB | F | H | 2H | 3H | 4H | 5H | 9H |
|---|---|---|---|---|---|---|---|---|---|
| Pencil Scratched | HB | F | H | 2H | 3H | 4H | 5H | 9H | |
| Hardness No | 0 | 1 | 2 | 3 | 4 | 5 | 6 | 7 | 8 |

The resulting evaluation data are shown in the following Table II:

Table II

| | Solubility | | | | Hardness | | | |
|---|---|---|---|---|---|---|---|---|
| Run #B— | Dried 3 days at R. T. | | Dried at 110° C. | | Dried 3 days at R. T. | | Dried at 110° C. | |
| | No. Cat. | +0.05% Cobalt | 3 hrs. | 15 hrs. | No. Cat. | +0.05% Cobalt | 3 hrs. | 15 hrs. |
| 30 | I | I | I | I | 4 | 6 | 7 | 6 |
| 31 | I | I | I | I | 7 | 7 | 7 | 7 |
| 32 | I | I | I | I | 7 | 7 | 8 | 7 |
| 33 | I | PSD | I | I | 7 | 7 | 8 | 7 |
| 34 | I | PSF | I | I | 7 | 7 | 8 | 8 |
| 10 | PSF | PSF | I | I | 7 | 7 | 8 | 8 |

From these determinations, it will be observed that the polymer makes an excellent strength, highly insoluble coating. Other determinations show that, in addition, its resistance to weather generally is excellent and its resistance to chemical reagents likewise is excellent.

EXAMPLE 3

A polymer of 50 parts of cyclopentadiene with 50 parts of isobutylene was prepared as described in Example 2 the reaction being carried to about 60% of completion; and the solid polymer was compounded according to the following recipe:

```
                                                Parts
Copolymer ------------------------------------ 60
Zinc oxide ------------------------------------ 4
Sulfur ---------------------------------------- 10
Tuads ---------------------------------------- 1.5
```

This mixture was then cured at a temperature of 340° F. for 30 minutes. The cured product was a very hard, somewhat flexible resin having somewhat the properties of hard rubber, but with higher strength and lower brittleness.

EXAMPLE 4

A similar resin was prepared containing approximately 60 parts of cyclopentadiene and 40 parts of isobutylene, according to the procedure outlined in Example 2 the reaction being carried to about 60% of completion. Simultaneously, a modified phenol formaldehyde condensation resin was prepared and the two were mixed in approximately equal quantities. The mixture was cooked at 500° F. for 15 minutes, and the cooked reaction mixture was then diluted to 4 times its original volume by the addition of toluene. Films were coated upon test panels from the resulting solution. The coated panels were then dried at room temperature and were found to have on them hard, insoluble, flexible surface coatings. To other samples of the same material 0.05% of cobalt naphthenate was added to increase the drying speed and this mixture also yielded an excellent, tough, hard, slightly elastic coating.

EXAMPLE 5

A polymer of equal parts of cyclopentadiene and isobutylene was prepared, as in Example 2, and dissolved in carbon tetrachloride. The solution was then treated with gaseous chlorine until the theoretical amount necessary to saturate all of the double bonds remaining in the polymer was absorbed. The resulting resin was soluble in many solvents including the carbon tetrachloride in which it was prepared, the mono and poly alkyl, the lower hydrocarbon solvents and the like. The solution in carbon tetrachloride was applied to test panels and allowed to dry. The resulting film was found to be tough, strong and durable, and to make an excellent coating with heat resisting properties superior to most coating and film-forming materials.

EXAMPLE 6

A solution of 10 g. of cyclopentadiene, 50 g. of isobutylene and 50 g. of styrene in 500 cc. of MeCl was cooled to −100° C. and to the well stirred mixture was added a dilute $AlCl_3$—MeCl catalyst solution (0.2 g. $AlCl_3$/100 cc.). Simultaneously an additional 10 g. of cyclopentadiene was added dropwise. When a conversion of 95% was reached the reaction mixture was poured into one volume of toluene which contained sufficient isopropyl alcohol to deactivate the excess catalyst. After the low boiling constituents were removed films were cast on metal panels. Air dried films became insoluble in hydrocarbons in two days at room temperature while insolubilization occurred in 10–15 minutes at 200° C. In both cases hard, flexible, adherent films were obtained with excellent chemical resistance.

Thus the process of the invention polymerizes cyclopentadienes and its homologues; and the various substituted cyclopentadienes into highly valuable polymers which are of substantial value as structural materials. The process of the invention also copolymerizes major proportions of cyclopentadienes and its homologues with minor proportions of wide range of other olefinic materials to produce still other polymers which are reactive, with oxygen and with various curing agents such as para quinone dioxine and its homologues and a wide range of dinitroso compounds. These reactions occur readily in the presence of the reactives or they may be facilitated by the presence of a wide range of catalysts such as the metal naphthenate driers and the rubber accelerators including such substances as diphenylguanidine, mercaptobenzothiazole, tetramethylthiuram monosulfide, tetramethylthiuram disulfude, zinc dibutyldithiocarbamate, selenium diethyldithiocarbamate and the like. The resulting polymers also are thermo plastic and thermo setting and are excellent moulding compositions either as such, or with a wide range of fillers. They are highly satisfactory for moulding articles generally where the high elongation of rubber is not needed. They are excellent materials for the making of floor tiles, linoleum substitutes and lacquers generally. In admixture with such substituents as ground cork, wood floor, cotton linters and the various pigments and fillers, they yield excellent moulded articles of good strength, low brittleness and other excellent physical properties which are readily moulded and readily hardened into very high grade structures.

While there are above disclosed, but a limited number of embodiments of the process and composition of the invention, it is possible to produce still other embodiments without departing from the inventive concept herein disclosed and it is therefore desired that only such limitations be imposed on the appended claims as are stated therein or required by the prior art.

The invention claimed is:

1. The method of preparing a homogeneous copolymer of a cyclopentadiene and a mono-olefin comprising the steps in combination of preparing a mixture containing a substantial excess of the mono-olefin, sufficient to produce a copolymer containing the desired major amount of the cyclopentadiene, cooling the mixture to a temperature within the range between −10° C. and −164° C. in the presence of a diluent-solvent for the mono-olefin and cyclopentadiene compound, starting the flow into the cold mixture of a small stream of fluid Friedel-Crafts active metal halide catalyst, and simultaneously starting the flow into the mixture of a small stream of mixed cyclopentadiene compound and mono-olefin, mixed in the proportion desired in the finished polymer, the stream of mixed olefins being delivered at approximately the rate at which polymerization is taking place, whereby a sufficient excess of mono-olefin is maintained in the mixture to force into the copolymer the desired amount of mono-olefin to produce a copolymer containing in the polymer molecule a major proportion of the cyclopentadiene, the copolymer being characterized by a Staudinger molecular weight number within the range between 3,000 and 100,000; an iodine number within the range between 50 and 300; reactivity with sulfur in a curing reaction to reduce the hydrocarbon solubility and reactivity with atmospheric oxygen in a drying reaction.

2. A method according to claim 1 wherein the cyclopentadiene is cyclopentadiene.

3. The method of preparing a homogeneous copolymer of methylcyclopentadiene and a mono-olefin comprising the steps in combination of preparing a mixture containing a substantial excess of the mono-olefin, sufficient to produce a copolymer containing the desired major amount of methylcyclopentadiene, cooling the mixture to a temperature within the range between −10° C. and −164° C. in the presence of a diluent-solvent for the mono-olefin and methylcyclopentadiene compound, starting the flow into the cold mixture of a small stream of fluid Friedel-Crafts active metal halide catalyst, and simultaneously starting the flow into the mixture of a small stream of mixed methylcyclopentadiene compound and mono-olefin, mixed in the proportion desired in the finished polymer, the stream of mixed olefins being delivered at approximately the rate at which polymerization is taking place, whereby a sufficient excess of mono-olefin is maintained in the mixture to force into the copolymer the desired amount of mono-olefin to produce a copolymer containing in the polymer molecule a major proportion of the cyclopentadiene, the copolymer being characterized by a Staudinger molecular weight number within the range between 3,000 and 100,000; an iodine number within the range between 50 and 300; reactivity with sulfur in a curing reaction to reduce the hydrocarbon solubility and reactivity with atmospheric oxygen in a drying reaction.

4. The method of preparing a homogeneous copolymer of methylcyclopentadiene and isobutylene comprising the steps in combination of preparing a mixture containing a substantial excess of isobutylene, sufficient to produce a copolymer containing the desired major amount of methylcyclopentadiene, cooling the mixture to a temperature within the range between −10° C. and −164° C. in the presence of a diluent-solvent for the isobutylene and methylcyclopentadiene compound, starting the flow into the cold mixture of a small stream of fluid Friedel-Crafts active metal halide catalyst, and simultaneously starting the flow into the mixture of a small stream of mixed methylcyclopentadiene compound and isobutylene, mixed in the proportion desired in the finished polymer, the stream of mixed olefins being delivered at approximately the rate at which polymerization is taking place, whereby a sufficient excess of isobutylene is maintained in the mixture to force into the copolymer the desired amount of isobutylene to produce a copolymer characterized by a Staudinger molecular weight number within the range between 3,000 and 100,000; an iodine number within the range between 50 and 300; reactivity with sulfur in a curing reaction to reduce the hydrocarbon solubility and reactivity with atmospheric oxygen in a drying reaction.

5. The method of preparing a homogeneous copolymer of a cyclopentadiene and a mono-olefin comprising the steps in combination of preparing a mixture containing a substantial excess of the mono-olefin, sufficient to produce a copolymer containing the desired major amount of cyclopentadiene, cooling the mixture to a temperature within the range between −10° C. and −164° C. in the presence of liquid ethylene for the mono-olefin and cyclopentadiene compound, starting the flow into the cold mixture of a small stream of fluid Friedel-Crafts active metal halide catalyst, and simultaneously starting the flow into the mixture of a small stream of mixed cyclopentadiene compound and mono-olefin, mixed in the proportion desired in the finished polymer, the stream of mixed olefins being delivered at approximately the rate at which polymerization is taking place, whereby a sufficient excess of mono-olefin is maintained in the mixture to force into the copolymer the desired amount of mono-olefin to produce a copolymer characterized by a Staudinger molecular weight number within the range between 3,000 and 100,000; an iodine number within the range between 50 and 300; reactivity with sulfur in a curing reaction to reduce the hydrocarbon solubility and reactivity with atmospheric oxygen in a drying reaction.

6. The method of preparing a homogeneous copolymer of a cyclopentadiene and isobutylene, comprising the steps in combination of preparing a mixture containing a substantial excess of isobutylene sufficient to produce a copolymer containing the desired major amount of the cyclopentadiene, cooling the mixture to a temperature of approximately −100° C. in the presence of a diluent-solvent for the isobutylene and the cyclopentadiene, starting the flow, into the cold mixture, of a small stream of a solution of aluminum chloride in methyl chloride, and simultaneously starting the flow into the mixture of a small stream of the cyclopentadiene and isobutylene, mixed in the proportion desired in the finished copolymer, the stream of mixed olefins being delivered at approximately the rate at which polymerization is taking place, whereby a sufficient excess of mono-olefin is maintained in the mixture to force into the copolymer the desired amount of isobutylene to produce a copolymer containing in the polymer molecule a major proportion of the cyclopentadiene, the copolymer being characterized by a Staudinger molecular weight number within the range between 3,000 and 100,000; an iodine number within the range between 50 and 300; and reactivity with sulfur in a curing reaction to reduce the hydrocarbon solubility and reactivity with atmospheric oxygen in a drying reaction.

7. A method according to claim 6 wherein the cyclopentadiene is cyclopentadiene.

JOHN D. GARBER.

REFERENCES CITED

The following references are of record in the file of this patent:

UNITED STATES PATENTS

| Number | Name | Date |
| --- | --- | --- |
| 1,720,929 | Staudinger | July 16, 1929 |
| 1,982,707 | Thomas | Dec. 4, 1934 |
| 2,273,158 | Thomas | Feb. 17, 1942 |
| 2,348,565 | Ott | May 9, 1944 |
| 2,352,980 | Soday | July 4, 1944 |
| 2,387,626 | Ward | Oct. 23, 1945 |
| 2,392,732 | Gerhart | Jan. 8, 1946 |

FOREIGN PATENTS

| Number | Country | Date |
| --- | --- | --- |
| 106,371 | Australia | Jan. 26, 1939 |